3,083,146
SULFONIC ACID PURIFYING TREATMENT
William M. Sweeney, Wappingers Falls, and John A. Patterson, Fishkill, N.Y., assignors to Texaco Inc., a corporation of Delaware
No Drawing. Filed Nov. 26, 1958, Ser. No. 776,428
3 Claims. (Cl. 202—39.5)

The instant invention relates to a process for purifying sulfonic acid, and more particularly to such process whereby sulfuric acid contamination is reduced in the sulfonic acid.

Ordinarily sulfonic acids are made by contacting an excess of an acid sulfonating agent such as oleum, $SO_3$, or strong sulfuric acid with an appropriate organic material, then separating off the unreacted sulfonating agent and/or sulfuric acid derivative thereof. Ordinarily an undesirable amount of sulfuric acid remains dispersed in the sulfonic acid because it is not readily separable physically.

Conventionally it is the practice to neutralize the dispersed sulfuric acid, e.g. with an aqueous base such as caustic soda or calcium hydroxide. In so doing by-product inorganic sulfates are formed. Frequently these are as undesirable in the sulfonic acid as is the sulfuric acid contamination, e.g. in the preparation of wetting agents, dyeing assistants, etc. To wash such salts out often creates difficulties with emulsions, and to separate them otherwise, e.g. by filtration, is frequently a difficult task.

Our invention does not involve the use of an inorganic neutralizing base, and it avoids attendant difficulties accompanying such neutralizing treatments. Broadly, the process comprises mixing a lower alkanol with the contaminated sulfonic acid, then stripping volatile material from the resulting mixture at a temperature between about 80° and 350° F.

The useful alkanols for our process are the $C_1$-$C_4$ alkanols, and the preferred one is methanol. For efficiency and economy in the practice of the invention dosage for a single treatment is advantageously at least about 2 mols of alkanol per mol of free sulfuric acid present. Smaller dosages can be used, however, with effectiveness and repetitive treatment can be desirable to reduce comparatively high proportions of free sulfuric acid in a given crude sulfonic acid.

While substantial initial proportions of alkanol, e.g. upwards to 50% of the mixture for treatment, can be used for the practice of our invention, ordinarily we prefer the use of lesser proportions, e.g. 10–30% by weight of the initial mixture. The use of such comparatively large proportions of alkanol assists in controlling the boiling point of the reaction mixture during the subsequent stripping operation to a desirable low value within the range called for, but other inert volatile diluents, even water, can be used effectively for this purpose also. After the alkanol has been mixed in, the resulting blend can be stored cold, or warmed as desired preparatory to the stripping step.

The stripping referred to herein is a simple distillation of volatile materials from the contaminated sulfonic acid-alkanol mixture. Excess alkanol is the principal volatile material to be stripped away. Other volatile materials which distill off can include water and light hydrocarbons, if present, and, presumably, lower alkyl esters of sulfuric acid. The stripping can be done at atmospheric pressure; to maintain temperature within a desired range reduced pressures can be used advantageously throughout or near the end of a stripping treatment when batch stripping is employed.

Frequently it is desirable to pass an inert gas such as flue gas, carbon dioxide, carbon monoxide, nitrogen or the like through the mixture to assist in the stripping. Alternatively, a flow of steam can be used to accomplish steam stripping or steam distillation of the volatile materials. Superheated steam and gas stripping at about atmospheric pressure are preferred for removing at least residual fractions of volatile materials from the mixture under treatment. The use of superatmospheric pressure only suppresses volatilization. Accordingly, use of an elevated pressure is not indicated.

The temperature should be at least about 80° F. for removal of the sulfuric acid contaminant at a reasonable rate. Above about 350° F., however, there is a substantial risk of thermal breakdown of various materials in process and this is, of course, undesirable. Preferably the stripping temperature is between about 100° and about 200° F. when treating technical grade sulfonic acids made by sulfonating hydrocarbons. In such instance the use of temperatures substantially above about 200° F. causes heat-sensitive materials (usually present in trace quantities) to be altered deleteriously, thereby risking a bloom, blush, or haze in the resulting finished sulfonate salt product made from such overheated sulfonic acid.

Suitable sulfonic acids for treatment in our process include petroleum sulfonic acids such as mahogany sulfonic acids and green sulfonic acids, alkylated aromatic sulfonic acids, petrolatum sulfonic acids, paraffin wax sulfonic acids, petroleum naphthene sulfonic acids, polyisobutylene sulfonic acids, mono- and poly-wax or other alkyl substituted benzene sulfonic acids, mono- and poly-wax or other alkyl substituted naphthalene sulfonic acids, mono- and poly-wax or other alkyl substituted cyclohexyl sulfonic acids, and mixtures of the foregoing. Frequently the viscosity of the sulfonic acids will have been reduced by mixing them with an inert diluent such as a petroleum hydrocarbon or synthetic hydrocarbon fraction such a lubricating oil fraction, a gas oil fraction, or an even lighter cut. High boiling diluents, e.g. having atmospheric boiling point substantially above 350° F. at atmospheric pressure, are preferred because they are not driven off in any great quantity by our treatment.

Our treatment can be used by itself or in conjunction with other conventional treatment such as ion exchange contact to reduce the mineral acidity in the sulfonic acid. It serves also as a drying operation in the case that the contaminated sulfonic acid for treatment is wet. The materials of construction are suitably corrosion-resistant, e.g. austenitic stainless steel, lead-lined, or the like.

The following example shows how our invention has been practiced, but it should not be construed as limiting the invention.

*Example.*—The sulfonic acid being treated was a technical grade of para toluene sulfonic acid monohydrate of the following gravimetric analysis: ash 0.82%; water (Karl Fischer) 9.95%; sulfuric acid 3.95%; p-toluene sulfonic acid 82.65%; o-toluene sulfonic acid 1.25%; M.P. 98–100° C. 100 parts of this sulfonic acid and 40 parts of methyl alcohol were charged into a distillation vessel and heated to 158° F. Pressure was reduced over the mixture to strip off methyl alcohol, the temperature declining to 104° F. in this operation. 30 parts of demineralized water were added to reform the monohydrate, the excess of water being removed by distillation at subatmospheric pressure while heating to a temperature of 176° F. The sulfuric acid concentration in the resulting product was reduced to 2.6%.

We claim:
1. A process for reducing sulfuric acid contamination of a sulfonic acid selected from the group consisting of petroleum sulfonic acids, alkylated aromatic sulfonic acids, polyisobutylene sulfonic acids, alkyl substituted cyclohexyl sulfonic acids, and mixtures thereof, said method consisting of mixing said sulfonic acid contaminated with sulfuric acid with an alkanol of from 1 to 4 carbons, inclusively, said alkanol being initially present in the resultant mixture in an amount of 10 to 50 wt. percent, and distilling volatile materials from said resultant mixture including alkyl sulfates formed therein at a temperature between about 80 and 350° F.

2. A process of claim 1 wherein said alkanol is methanol.

3. A process of claim 1 wherein said distilling is accomplished by stripping with an inert gas at a temperature between about 100 and 200° F.

References Cited in the file of this patent

UNITED STATES PATENTS

| | | |
|---|---|---|
| 2,848,415 | Logan | Aug. 19, 1958 |
| 2,940,936 | Fike | June 14, 1960 |